United States Patent [19]
De Antoni et al.

[11] Patent Number: 5,821,538
[45] Date of Patent: Oct. 13, 1998

[54] SYSTEM FOR THE PROCESSING OF PULSES RESULTING FROM THE INTERACTION OF A GAMMA PARTICLE WITH A CDTE RADIATION DETECTOR

[75] Inventors: Philippe De Antoni, Les Ulis; François Lebrun, Champigny sur Marne; Jean Paul Leray, Saint-Cheron, all of France

[73] Assignee: Commissariat a l'Energie Atomique, Paris, France

[21] Appl. No.: 704,864

[22] Filed: Aug. 30, 1996

[30] Foreign Application Priority Data

Sep. 12, 1995 [FR] France .................................. 95 10670

[51] Int. Cl.⁶ ...................................................... G01T 1/17
[52] U.S. Cl. .................................. 250/370.01; 250/370.06
[58] Field of Search ......................... 250/370.13, 370.06, 250/370.01

[56] References Cited

U.S. PATENT DOCUMENTS 4,485,442 11/1984 Snaper et al. .
4,937,452 6/1990 Simpson et al. ................... 250/370.06

FOREIGN PATENT DOCUMENTS

| 0167119A2 | 1/1986 | European Pat. Off. .......... 250/370.01 |
| WO 90/08331 | 7/1990 | WIPO . |
| WO 93/15420 | 8/1993 | WIPO . |
| WO 95/11460 | 4/1995 | WIPO . |

OTHER PUBLICATIONS

E. N. Arkad'eva, L. V. Maslova, O. A. Matseev, S. V. Profok'ev, S. M. Rykin, and A. Kh. Khusainov, "Spectrometric gamma quantum detectors using cadmium telluride crystals." *Sov. Phys. Dokl.*, vol. 20, No. 3 (Mar. 1975) pp. 211–213.

L. T. Jones and P. B. Woollam, "Resolution Improvement in CdTe Gamma Detectors Using Pulse–Shape Discrimination." *Nuclear Instruments and Methods*, vol. 124 (1975) pp. 591–595.

*Primary Examiner*—Constantine Hannaher
*Attorney, Agent, or Firm*—Oblon, Spivak, McClelland, Maier & Neustadt, P.C.

[57] ABSTRACT

A system for processing information resulting from the interaction of a gamma particle with a CdTe radiation detector (1) including a charge amplifier (3) for transforming information into analog pulses and electronic measuring devices (4) including an amplitude circuit (10) for acquiring the amplitude of the pulse given the starting instant of the measuring of the pulse rise time and a time circuit (18) ensuring detection of the end of the pulse rise time. The two circuits are coupled for purposes of synchronization and the determination of the pulse rise time. Radioactive sources and software ensure the calibration of the response of the detector as a function of the rise time, the modeling of the detector charge losses and the correction of the detector charge losses as a function of the rise time supplied by the measuring devices.

6 Claims, 4 Drawing Sheets

SYSTEM FOR THE PROCESSING OF PULSES RESULTING FROM THE INTERACTION OF A GAMMA PARTICLE WITH A CDTE RADIATION DETECTOR

DESCRIPTION

TECHNICAL FIELD

The invention relates to a system for processing electronic pulses resulting from the interaction of a gamma particle with a cadmium telluride detector in order to correct the charge losses due to said detector.

The invention has applications in the field of gamma spectrometry and in particular for the implementation of a portable spectrometer and a CdTe crystal imager e.g. usable in medicine and numerous nuclear fields.

PRIOR ART

In the gamma spectrometry field, use is frequently made of cooled germanium spectrometers, which have a very good resolution. However, they have various disadvantages. Thus, due to the cooling of the germanium it is necessary to use either liquid nitrogen, or a cryogenic motor, which involves a certain weight and certain overall dimensions. It is consequently not possible to envisage the production of easily transportable, autonomous, compact, lightweight systems based on cooled germanium detectors.

In addition, germanium has a relatively low atomic number of 32, which leads to a high total absorption volume for energies above 200 keV. Consequently this limits to 1 cm the spatial resolution of cooled germanium-based imaging systems.

Germanium also has a small forbidden band width (0.7 eV), which does not permit operation at ambient temperature.

However, wide forbidden band semiconductors exist, which allow operation at ambient temperature. Among these reference is made to mercuric iodide, as well as cadmium telluride (CdTe). Thus, CdTe has the advantage of a sufficiently wide forbidden band of 1.45 eV to operate at ambient temperature.

It also has a relatively high density (6 g.cm$^{-3}$), as well as high atomic numbers (48 and 52), which permits a total absorption in detectors of only a few millimetres.

Therefore cadmium telluride is of particular interest in spectrometry. At low energy, i.e. for energies below 50 keV, the spectrometric performance characteristics of cadmium telluride are intermediate between those proposed by a conventional scintillator and those proposed by cooled germanium.

However, such performance characteristics cannot at present be maintained at high energy, because cadmium telluride detectors have very significant charge losses, so that in a spectrum there is a large left continuum of the spectral lines. This poor spectral response at high energy consequently limits the resolution of cadmium telluride detectors and consequently their use is often limited to low energy.

It is therefore necessary to quantify the charge losses of such a CdTe detector in order to correct them. The only correction criterion for the charge losses of the detector is the rise time of the pulse resulting from the interaction of the gamma particle on the CdTe detector. This pulse rise time is representative of the attenuation of the amplitude of said pulse. Thus, the higher the charge losses and the longer the pulse rise time, the greater the attenuation. It is therefore possible to again find the real energy of the incident gamma particle on the basis of a combination of the amplitude and the rise time of the pulse.

EURORAD at present manufactures a gamma spectrometry measuring apparatus making it possible to correct such charge losses. This measuring apparatus can be adapted to CdTe crystal detectors of the travelling heater method (THM) type making it possible to perform on the one hand a measurement of the amplitude of the pulse resulting from the interaction of a gamma particle with the CdTe detector and on the other a measurement of the rise time of said pulse. This measuring apparatus also permits an immediate correction of the charge losses of the detector, because the information obtained at the output of said apparatus can be directly interpreted as a single energy spectrum.

A CdTe crystal has rise times between approximately 500 ns and 8 μs. However, as a result of its design, said apparatus is limited to maximum rise times of 2 μs and beyond the latter the pulses are no longer taken into account by the electronic processing circuit. This leads to a relatively high efficiency loss on the part of the apparatus.

In addition, in said apparatus, the correction of the charge losses is brought about by means of analog electronics which have to be adapted whenever the detector is changed by means of potentiometric settings or controls, which are performed during a calibration procedure. However, said calibration procedure is complex, because the different detectors used have a wide dispersion of characteristics. Thus, for each CdTe crystal change, the calibration procedure must be repeated.

Therefore this apparatus does not make it possible to construct a multi-crystal imager because, in this case, this would require the same number of specific electronics as detectors used, which would lead to an unacceptable increase in the number of controls and overall dimensions.

DESCRIPTION OF THE INVENTION

The object of the invention is to obviate the aforementioned disadvantages. To this end, it proposes a system for processing pulses from CdTe detectors in order to correct the charge losses of said detectors. This processing system, which can be connected to one or more CdTe detectors without any electronic control, takes into account all the pulses having rise times between 500 ns and 8 μs. and proposes a very simple calibration procedure for each detector.

More specifically, the invention relates to a system for processing pulses resulting from the interaction of a gamma particle with a cadmium telluride (CdTe) radiation detector having:

a charge preamplifier able to amplify these analog pulses,     electronic measuring means ensuring a measurement of the amplitude of each pulse, as well as a measurement of the rise time of said pulse, characterized in that:

the electronic measuring means comprise an amplitude circuit ensuring the acquisition of the amplitude of the pulse and a time circuit ensuring a minimizing of the noise of the pulse, as well as a detection of the end of the pulse rise time, said two circuits being coupled in order to ensure the determination of the pulse rise time.

Advantageously, the electronic measuring means incorporate a ramp circuit connected to the amplitude circuit and to the time circuit.

According to an embodiment of the invention, the electronic measuring means also incorporate a logic control unit connected to the amplitude circuit, to the time circuit and to the ramp circuit, in order to control the information exchange between these circuits.

Preferably, the processing system for the pulses resulting from the interaction of a gamma particle with a cadmium telluride (CdTe) radiation detector also has correction means for correcting, as a function of the rise time and the amplitude of the pulse, the charge losses of the detector.

Advantageously, said correction means are data processing means able to model the charge losses of the detector, followed by the determination and correction, as a function of said modelling and the rise time determined by the measuring means, the charge losses due to the detector.

The invention also relates to a process for the correction of charge losses on the basis of digitized measurements of the amplitude and the rise time of pulses supplied by a cadmium telluride detector. This process has a first measuring stage for each rise time of the response of the detector to calibrated stresses and the determination of the variation relation of said responses as a function of the rise time and a second stage of correcting charge losses by applying said relation to new measurements.

DETAILED DESCRIPTION OF EMBODIMENTS OF THE INVENTION

Figure 1:
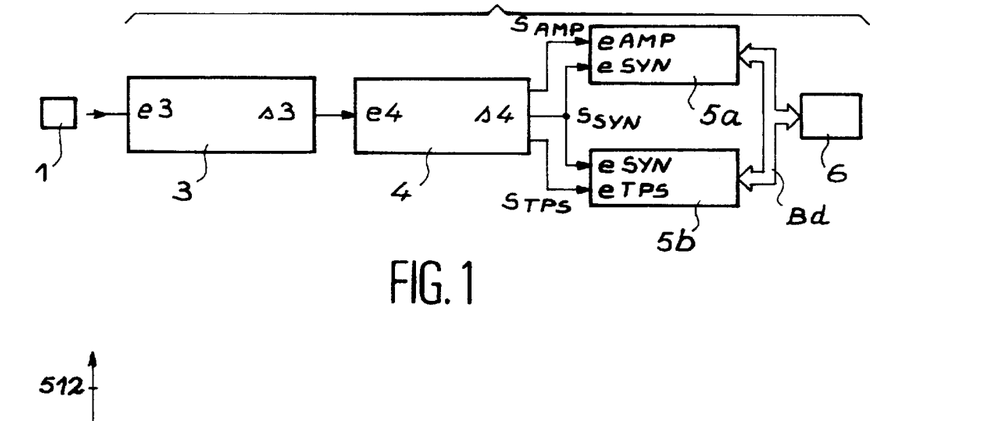
FIG. 1 diagrammatically shows a connection circuit of the different means constituting the processing system from pulses from the CdTe detector according to the invention.

FIG. 1 diagrammatically shows the various means constituting the system according to the invention and their interconnections, as well as the CdTe detector to which the system is connected. In FIG. 1 the CdTe detector is 1 and the elements constituting the system according to the invention is 2.

As shown in FIG. 1, the output of the detector 1 is connected to the input $e_3$ of a charge preamplifier 3 ensuring the transformation of the information coming directly from the detector 1 into an analog pulse which can be electronically processed. This charge preamplifier 3 includes a polarization circuit. The preamplifier and the polarization circuit are of known types, so that there is no need for a detailed description here.

The charge preamplifier 3 is connected by its output s3 to electronic measuring means 4, which consist of an electronic card permitting biparametric measurements, namely the amplitude of the pulse and its rise time. This electronic card is called the "BIPAR card".

As will be explained hereinafter, said electronic BIPAR card males it possible to determine on the one hand the amplitude of the pulse from the detector 1 and on the other the rise time of said pulse. At the output of said electronic BIPAR card 4 are consequently obtained the three signals necessary for the remainder of the processing, namely:

an amplitude signal $S_{AMP}$ corresponding to the amplitude of the pulse from the detector 1, a time signal $S_{TPS}$ indicating the rise time of the pulse from the detector 1 and a synchronization signal $S_{SYN}$ also emitted by the electronic card 4 in order to synchronize all the processing operations to be carried out on $S_{AMP}$ and $S_{TPS}$.

The amplitude signal $S_{AMP}$ and the synchronization signal $S_{SYN}$ are both supplied to an analog/digital coder (A/D), designated 5a. In parallel, the time signal $S_{TPS}$ and the synchronization signal $S_{SYN}$ are transmitted to an analog/digital coder 5b.

Each of the A/D coders 5a and 5b converts the analog signal received from the electronic card 4 into a digital signal which can be processed by the data processing means 6. These A/D coders 5a and 5b carry out conversions of the signals $S_{AMP}$ and $S_{TPS}$ in synchronization with one another as a result of the signal $S_{SYN}$. The digital signals emitted by the A/D coders 5a and 5b are then supplied to data processing means 6 by means of a data bus Bd.

According to the invention, each of the coders 5a and 5b has a RAM memory in which are stored the data, i.e. the different signals $S_{AMP}$ and $S_{TPS}$ received from the electronic card and to which the data processing means 6 can have access when they wish via the data bus Bd.

The data processing means 6 will process the data relative to the amplitude and rise time of the pulse from the CdTe detector in order to quantify the charge losses. These processings will be described in greater detail herein-after.

Figure 2:
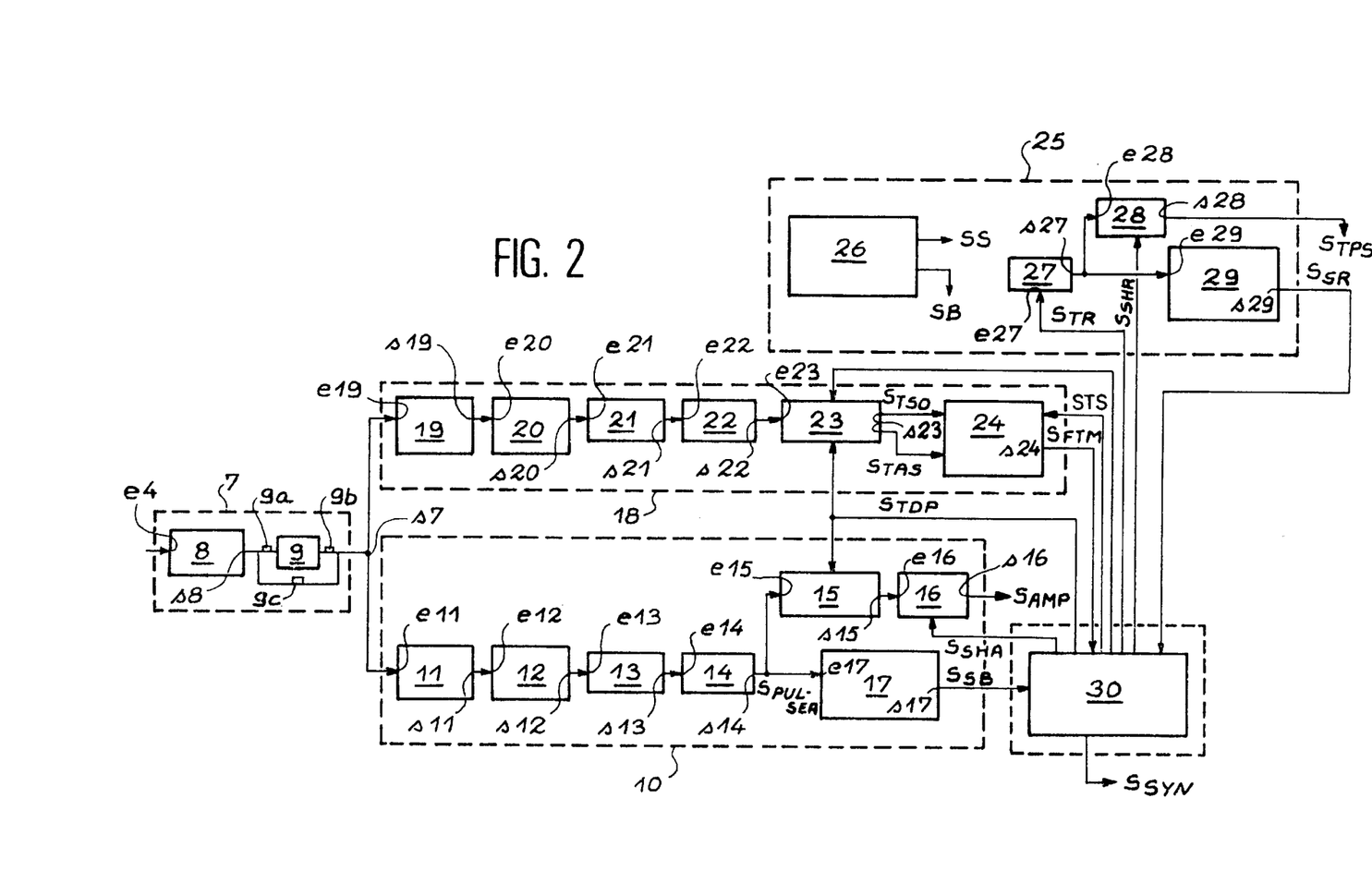
FIG. 2 diagrammatically shows the mimic diagram of the electronic card permitting the determination of the amplitude and the rise time of the pulse from the CdTe detector.

The electronic BIPAR card 4 in FIG. 1 is shown in greater detail in FIG. 2. This electronic card 4, which is connected, as was seen in FIG. 1, to the output s3 of the charge preamplifier 3, receives on its input e4 the analog pulse from the charge preamplifier 3.

This electronic card 4 has an input circuit 7 into which is introduced the analog pulse from the preamplifier by means of a coaxial connecting cable. The input e4 of the analog card 4 consequently also corresponds to the input of the input circuit 7, whose function is to:

adapt the input impedance of the electronic card 4 to a previously defined value, which is advantageously 50 ohms, said impedance value being characteristic of the coaxial cable connecting the charge preamplifier 3 to the electronic BIPAR card 4, said impedance adaptation or matching having the advantage of avoiding the appearance of an overvoltage on the transmitted analog pulse;

amplifying the analog pulse received with a predetermined gain so as to obviate the losses linked with the adaptation, said amplification gain being e.g. 5;

choosing the polarity sign of the analog pulse as a function of the polarity of the pulse from the charge amplifier, so that the processing subsequently carried out is only performed on positive pulses.

In order to perform these functions, the input circuit 7 has an input amplifier. 8 ensuring the impedance matching to the previously defined value and the amplification of the pulse supplied by the preamplifier. To the amplifier 8 is connected an inverter 9 equipped with straps 9a, 9b, 9c in order to optionally reverse the polarity sign.

The s ignal then obtained at the output s7 of the input circuit 7 is consequently adapted so as to be processed by the amplitude circuit 10 and the time circuit 18. It therefore acts simultaneously on two channels, namely the amplitude channel 10 (or amplitude circuit 10) and the time channel 18 (or time circuit 18).

The first aim of the amplitude circuit 10 is permit the measurement of the amplitude of the pulse from the detector in order to accurately acquire the maximum of said pulse following a shaping optimizing the signal to noise ratio.

This function of detecting the maximum of the pulse is ensured by two elements constituting the base of said amplitude circuit 10, namely a band pass filter optimizing the signal to noise ratio and a peak detector. More specifically, the amplitude circuit 10 incorporates a C-R passive differentiator 11 connected to the output s7 of the input circuit 7. This differentiator 11 makes it possible to carry out a pseudo-pole-zero cancellation so as to ensure a rapid return to the 0 V voltage level following the passage of a pulse, which thus makes it possible to prepare the arrival of the following pulse. For example, said differentiator 11 can have a cutoff frequency of 234 kHz at −3 dB and can be implemented on the basis of a resistance of approximately 10 Kohms in parallel with a capacitance of approximately 8.6 nF in order to implement the pole-zero cancellation function.

Connected to the output s11 of the differentiator 11, the amplitude circuit 10 has a low pass filter 12 permitting the optimization of the pulse signal to noise ratio. According to the invention, the filter 12 is an order 8 BESSEL integrating filter with a cutoff frequency of 500 kH at −6 dB making it possible to act on the pulse without causing an overvoltage on the latter.

The output s12 of the filter 12 is connected to two amplifier stages 13 and 14. More specifically, these gain amplifiers 13 and 14 have the function of increasing the gain of the pulse to be processed, so as to permit a more precise detection of the maximum of said pulse.

According to the invention, these amplifiers are inverting amplifiers, the amplifier 13 having a gain A and the amplifier 14 a gain B. For information purposes, the gain A of the amplifier 13 can be −4 and the gain B of the amplifier 14 −5.75.

According to an embodiment of the invention, the second inverting amplifier 14 can incorporate an offset control.

The output s14 of the second gain amplifier 14 is connected on the one hand to a peak detector 15 and on the other to a comparator 17, which supplies a signal $S_{PULSEA}$.

The peak detector 15 makes it possible to acquire the maximum of the pulse and is controlled by a logic TTL signal $S_{TDP}$ supplied by the logic control unit 30 to be described hereinafter. More specifically, when the signal emitted by the logic unit 30 is at 1, the peak detector 15 is blocked at 0 V. Conversely, if the signal emitted by the logic unit 30 is at 0, the peak detector 15 is in the acquisition mode.

More specifically, the signal $S_{TDP}$ emitted by the logic unit 30 controls two transistors, which are not shown in the drawing in order not to overburden it and namely a first transistor for zeroing the memory capacity and a second transistor for avoiding the peak detector switching on noise, which would then generate switching interference.

The output s15 of this peak detector is connected to a sample and hold circuit 16 ensuring the storage of the maximum amplitude value. This sample and hold circuit 16 is also controlled by the logic control unit 30 by a signal $S_{SHA}$.

At the output s16 of said sample and hold circuit is obtained the amplitude signal $S_{AMP}$ representative of the maximum amplitude of the processed pulse. This signal $S_{AMP}$ will subsequently be used by the data processing means 6 for determining the charge losses.

In parallel with the peak detector 15, the output s14 of said second gain amplifier 14 is connected to a comparator 17. The latter ensures the comparison of the signal amplified by the amplifiers 13 and 14 with a low threshold SB, which makes it possible to initiate the measurement of the pulse and mark an absolute start pulse or cue for the determination of the rise time. Thus, as shown in FIG. 2, the signal SSB from the comparator 17 is supplied to the logic control unit 30, which is connected to the time circuit 18, which thus permits the synchronization of the amplitude circuit 10 with the time circuit 18.

The rising front of the signal $S_{SB}$ is characteristic of the start of the pulse rise time. The reception of said signal $S_{SB}$ by the logic unit 30 consequently conditions the remainder of the processing.

As explained hereinbefore, the output s7 of the input circuit 7 is connected, in parallel to the amplitude circuit 10, to the time circuit 18. The time circuit 18 has a comparable architecture to the amplitude circuit 10, so that only the novel or different elements will be described.

The time circuit 18 incorporates a differentiation circuit 19 connected to the output s7 of the input circuit. Unlike the differentiator 11 of the amplitude circuit 10, said differentiation circuit 19 has no pseudo-pole-zero cancellation, because there is no need for the return to 0 V to be precisely known. In the time circuit 18 the function of the differentiation circuit 19 is to better mark the passage to the maximum of the pulse, which is a vital time for said measurement.

According to an embodiment of the invention, said function is performed by means of a double passive C-R filter and e.g. said filter can have a cutoff frequency of 7.2 kHz at −6 dB.

The output S19 of the differentiation circuit 19 is connected to the input e20 of a low pass filter 20. Advantgeously, said filter 20 is an order 8 BESSEL integrating filter and it has a similar function to the filter 12 of the amplitude channel, but preferably has a cutoff frequency of approximately 1 MHz at −6 dB in order to filter the noise without deteriorating the original shape of the pulses.

It should be noted that the choice of filters is inter alia conditioned by the time lags which they induce. The greatest time lag is caused by the amplitude channel, which includes the lowest frequency filter. However, unlike that of the amplitude channel, the time channel filter must not have a too high low cutoff frequency otherwise it will authorize peak detections following the passage of the peak on the time channel.

In the same way as for the amplitude channel 10, the output s20 of the low pass filter 20 is connected to two inverting amplifier stages 21 and 22 of respective gains A and B. According to an embodiment, the gain A of the amplifier 21 is −2 and the gain B of the amplifier 22 is −3.75.

At the output s22 of the second amplifier stage, i.e. of gain amplifier 22, the pulse is on a continuous level of 1 V. The control of this continuous voltage can be implemented by means of a potentiometer or a divider bridge, whose calculation is optimized as a function of the offset voltages.

The output s22 of these inverting amplifiers 21 and 22 is connected to a peak detector 23, whose basic operation is identical to the peak detector 15 of the amplitude channel 10.

However, this peak detector 23 is used differently as compared with the case of the amplitude channel 10. Thus, for the time channel 18, it is used so as to determine the end of the rise time of the pulses. This makes it possible to operate on both slow or fast pulses (for our application, the gamma of the rise times is between 500 ns and 8 $\mu$s) and independently of their shapes. In other words, this circuit is automatically adapted to the low frequency part of the spectrum of the pulses, which is more or less extensive as a function of the charge losses.

In order to optimize the operation of the peak detector 23, a modification is necessary by the addition of a resistor and a capacitor, compared with the standard, known diagram of the peak detector 15. For example, the values of these components can respectively be approximately 10 Kohms and 33 pF.

In said time circuit 18, the function of the peak detector 23 is to supply the end of pulse rise time information. These are properties of internal signals $S_{TAS}$ and $S_{TSO}$ of said peak detector 23 in the acquisition phase making it possible to acquire such an information. $S_{TAS}$ is the control signal of the peak detector 23 and $S_{TSO}$ the output signal equal to the maximum voltage of the pulse at the input e23 of the peak detector 23. Thus, when the pulse is in the rise phase, the voltage signal $S_{TSO}$ is below the voltage signal $S_{TAS}$. However, the passage to the maximum of the pulse gives rise to a change in the voltages, i.e. $S_{TSO}$ becomes higher than $S_{TAS}$. Thus, said two voltage signal $S_{TSO}$ and $S_{TAS}$ are introduced into a comparator 24, which carries out the comparison between said two signals in order to establish whether, as explained hereinbefore, $S_{TSO}$ exceeds $S_{TAS}$. Determination then takes place to establish if the pulse is in the rising phase or has reached its maximum.

The output s24 of the comparator 24 is connected to one of the inputs of the logic control unit 30 and supplies a logic signal $S_{FTM}$, whose rising front marks the rise time end.

The logic control unit 30 is also connected to the peak detector 23 of the time circuit, in the same way as for the peak detector 15 of the amplitude circuit 10. Thus, it supplies to the two peak detectors 15 and 23 the same logic signal $S_{TDP}$ ensuring their synchronization.

The logic unit 30 can also supply the comparator 24 with another logic signal Sts making it possible to block the signal $S_{FTM}$ at 0 at the start of the measurement in order to avoid interfering transient voltages.

According to the invention, the amplitude channel 10 and time channel 18 are designed so that their joint operation permits the measurement of the rise time on the one hand and on the other an amplitude measurement coherent with that of the rise time with a view to a mathematical processing. It is then said that these two channels are coupled. This coupling makes it possible to determine the pulse rise time on the basis of the determination of the rising fronts of the signal $S_{SB}$ (clearing the low threshold) of the amplitude channel 10 and the signal $S_{FTM}$ (pulse marking the rise time end) of the time channel 18. Thus, the pulse rise time is determined indirectly due on the one hand to the signal $S_{SB}$ measured on the amplitude channel 10 and on the other to the signal $S_{FTM}$ measured on the time channel 18. These two data relative to the clearing of the low threshold and the pulse or cue marking the end of the rise time are both fed to the logic control unit 30, which returns said informations to a threshold/ramp circuit 25.

The coupling of said two time and amplitude channels makes it possible to obtain freedom from the very varied shapes which the pulses can have when supplied by CdTe detectors. As a result of a narrow band pass filter, the amplitude channel 10 leads to a constant pulse shape. Thus, the start pulse marked by the signal $S_{SB}$ for the rise time measurement corresponds to a same starting reference for all the pulses which have to be processed by the system. Moreover, the time channel 18, due to a wide band pass filter, operates with respect to the real shape of the voltage in such a way as to detect the real end of the pulse rise time and thus take account of charge loss variations.

Thus, the coupling of these amplitude and time channels makes it possible to indirectly electronically measure the pulse rise time by means of an information representative of said rise time.

As stated hereinbefore, the BIPAR electronic card incorporates a circuit 25 known as a threshold/ramp circuit, which has on the one hand a voltage source 26 supplying the complete BIPAR card with reference voltages used in the comparators 17 and 29. A reference voltage SB known as the low threshold is in particular used in the comparator 17, where it is compared with the signal $S_{PULSEA}$. This voltage source 26 also supplies a reference voltage SS called the security threshold and whose use will be described hereinafter. According to an embodiment of the invention, said reference voltage source incorporates accessible potentiometers on which it is possible to effect chosen threshold controls. The threshold/ramp circuit 25 also has a ramp circuit 27 receiving at its input e27 a signal STR emitted by the logic: control unit 30. When said signal. $S_{TR}$ is at 0, a constant current generator linearly charges a capacitor, but when the signal $S_{TR}$ is at 1, said same capacitor is forced to 0 V.

The ramp circuit 27 also has an inverting gain amplifier connected to the capacitor and which can e.g. have a gain of −6.45.

The signal then obtained at the output s27 of the ramp circuit 27 is a signal, whose linear portion is representative of the pulse rise time.

A control or setting of the continuous starting voltage of the ramp circuit 27 makes it possible to tune the ramp in a window compatible with that of the analog/digital coder 5b connected to the output s28 in order to digitize the rise time signal.

According to a variant of the invention, the voltage ramp obtained as a result of the constant current generator of the circuit 27 is regulatable, which permits an adaptation to different converter types.

The signal obtained in this way at the output s27 of the ramp circuit 27 is introduced into a sample and hold circuit 28 which, in the acquisition mode, follows the ramp and, following a rising front of the signal $S_{FTM}$, stores the value in the ramp when the signal $S_{SHR}$ from the control logic 30, commands it.

At the output s28 of the sample and hold circuit 28 is then obtained the signal $S_{TPS}$ representative of the rise time of the pulse from the CdTe detector.

To the output s27 of the ramp circuit 27 is also connected a comparator 29 ensuring a comparison between the signal at s27 from the ramp 27 and a security threshold SS supplied by the reference voltage circuit 26. This makes it possible to fix a maximum limit of the rise time (to increase the resolution quality of the spectrum) or detect interfering events such as noise, which can trigger the low threshold SB, but not the end of the rise time SHd FTM. The comparator 29 generates a logic signal $S_{SR}$, which is supplied to the logic control unit 30, which controls all the circuits described hereinbefore.

Unit 30 more particularly has the following functions. It ensures the sequencing of the operations during a normal measurement and in particular the operation of detecting the clearing of the low threshold SB and the passage into the measuring mode. It also ensures the acquisition of the rise time and the amplitude maximum, the storage of the data in the sample and hold circuits and the digital conversion request by the synchronization square wave pulses $S_{SYN}$ connecting the electronic BIPAR card to the A/D converters shown in FIG. 1. It detects the stacks, whilst monitoring the low threshold. This function is conditioned by the separation performance characteristics of the filter 12 with respect to the amplitude channel 10.

The term "stack" is used for the result of two gamma interactions leading to an overlap of the first pulse by the second pulse from the CdTe detector. It also monitors the base line, i.e. checks whether the voltage of 0 V is stable. When a measurement is ended, the logic control unit 30 checks that a pulse is not present before authorizing a new cycle, so as to ensure that said cycle will start from a "proper" base line. In the opposite case, the logic unit 30 will decide on a waiting procedure to be carried out until the normal measuring mode is again possible. It carries out the control of the signal $S_{SR}$ marking the upper limit of the ramp.

Figure 3:
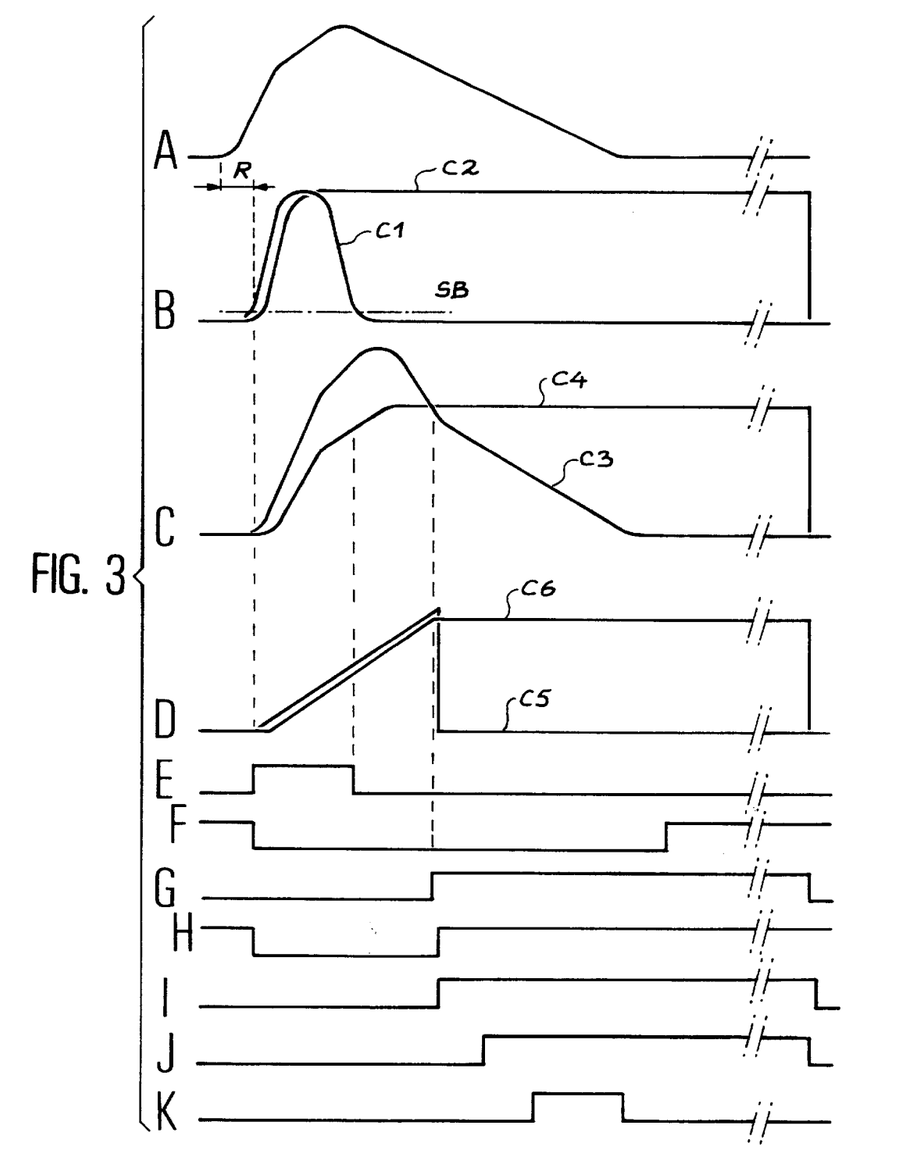
FIG. 3 shows the timing diagrams of different signals encountered in the electronic card and at the output of the latter.
Figures 3A, 3B:
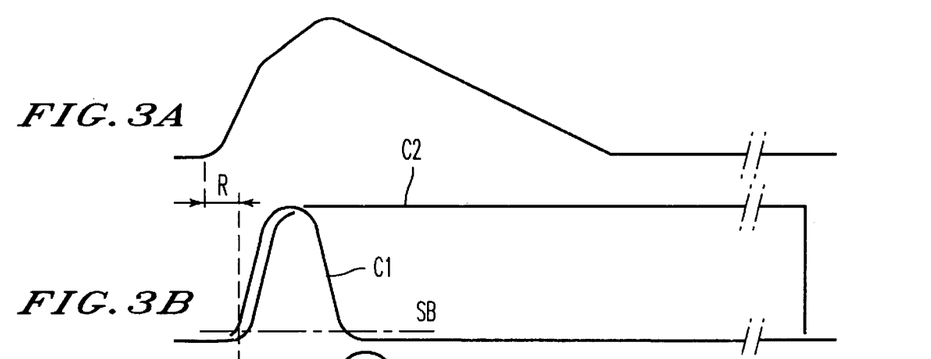
Figure 3C:
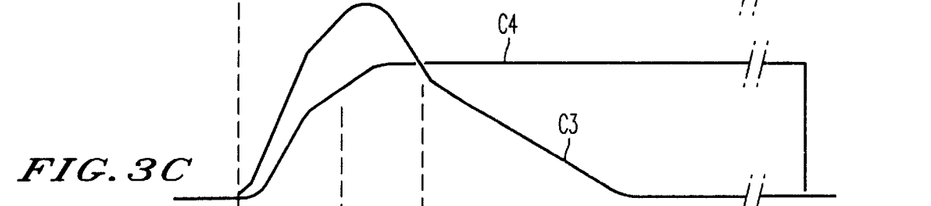
Figures 3D, 3E:
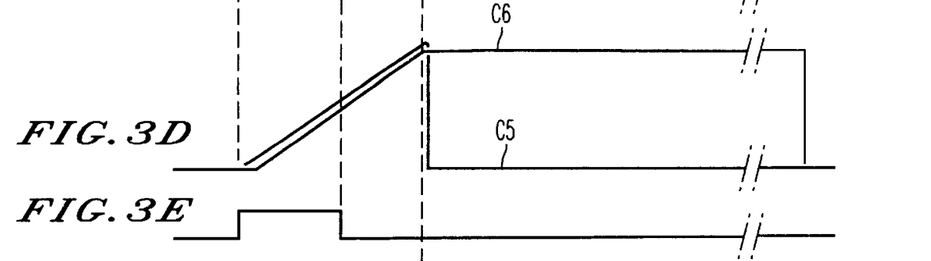
Figure 3F:
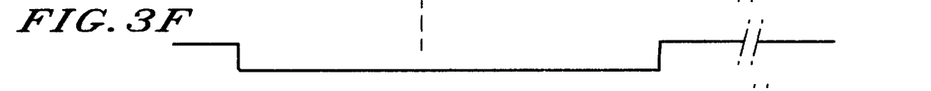
Figures 3G, 3H:
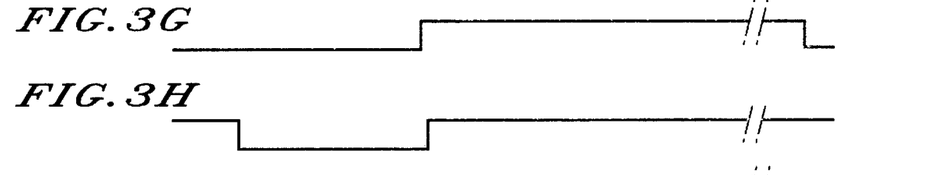
Figure 3I:
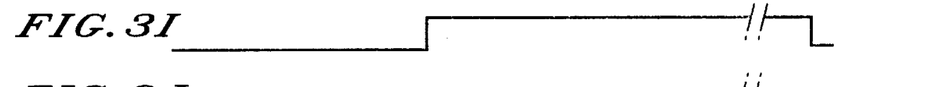
Figure 3J:
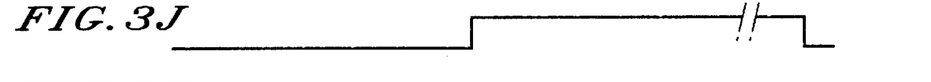
Figure 3K:
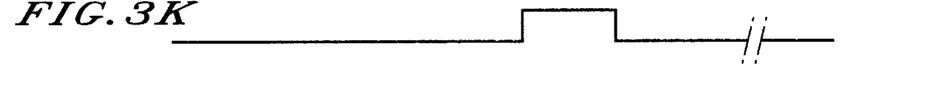

FIG. 3 shows various timing diagrams revealing the different signal encountered within the BIPAR electronic card and which are mostly controlled by the logic control unit 30.

On channel A of FIG. 3 is shown the pulse, such as is obtained at the output s22 of the double amplifier stage 21, 22 of the time channel 18, i.e. the pulse occurring at the input e23 of the peak detector 23.

On channel B curve C1 represents the signal obtained at the output s14 of the double amplifier stage 13 and 14 of the amplitude channel 10, i.e. the signal occurring at the input e15 of the peak detector 15. The mixed line curve represents the low threshold voltage SB. Curve C2 represents the signal $S_{AMP}$ obtained at the output of the amplitude channel 10, i.e. the signal representing the maximum amplitude of the pulse from the CdTe detector. This signal is offset or staggered by a time lag R compared with the signal of channel A. All the signals C to K will be offset by said time lag R compared with the signal of channel A.

On channel C of FIG. 3 is shown the curve C3 corresponding to the signal $S_{TAS}$ obtained at the output s23 of the peak detector 23, as well as the curve C4 corresponding to the signal $S_{TSO}$ obtained at the same output of the peak detector 23.

On channel D of FIG. 3 is shown by means of curve C5, the ramp signal obtained at the output s27 of the ramp circuit 27 and curve C6 represents the rise time signal $S_{TPS}$ obtained at the output s28 of the BIPAR electronic card.

On channel E of FIG. 3 is shown the shape of the signal $S_{SB}$ obtained at the output s17 of the comparator 17 of the amplitude channel 10.

On channel F is represented the signal $S_{TDP}$ supplied by the logic control unit 30 to each of the peak detectors 23 and 15.

Channel G of FIG. 3 shows the signal $S_{FTM}$ obtained at the output s24 of the comparator 24 of the time channel 18.

Channel H of FIG. 3 shows the signal $S_{TR}$ supplied by the logic control unit 30 to the ramp circuit 27.

Channel I of FIG. 3 shows the signal $S_{SHR}$ emitted by the logic control unit 30 and supplied to the sample and hold circuit 28.

Channel J of FIG. 3 shows the signal $S_{SHA}$ supplied by the logic control unit 30 to the sample and hold circuit 16.

Channel K of FIG. 3 represents the synchronization signal $S_{SYN}$ supplied by the logic control unit 30 to the analog/digital converters 5a and 5b in order to permit a synchronization during the digitizing of the amplitude signal $S_{AMP}$ and rise time signal $S_{TPS}$.

On considering these various timing diagrams, it will be seen that when a pulse appears at the input of the BIPAR electronic card, the rising front of the signal $S_{SB}$ initiates a measurement, which brings about the zeroing of the signal $S_{TDP}$, as well as the signal $S_{TR}$. The rising front of the signal $S_{FTM}$ then brings about the storage of the ramp value at this time on the order of the signal $S_{SHR}$ and then the amplitude value on the order of the signal $S_{SHA}$. Immediately, the signal $S_{TR}$ is set to 1, which again brings the ramp to 0. A clock with a chosen period of e.g. 6 μs is then authorized to sequence the emission of rise time and amplitude signals to the analog/digital coders, which represents the generation of the signal $S_{SYN}$.

According to a variant of the invention, a delay line is inserted in the time channel 18 in order to permit the use of frequencies of filters incompatible in phase shift terms, the propagation time of the time channel being smaller than that of the amplitude channel 10.

According to another variant of the invention, specific base line restoration and stack detection circuits can be added, which have better performance characteristics than those implemented by the logic control unit 30. Such a variant makes it possible to increase the counting frequency of the BIPAR electronic card.

According to yet another variant, whilst retaining the same BIPAr electronics architecture, the filter cutoff frequencies, the amplifier gains, the control of the peak detector 23 of the time channel 18 and the gradient of the ramp 27 can be modified in order to adapt to detector types other than CdTe detectors, for which the simultaneous measurement of the amplitude and the rise time has an interest.

According to another variant, whilst significantly complicating the amplitude channel 10 and the time channel 18, the electronic BIPAR card could proces bipolar pulses.

As has been seen in FIG. 1, the analog/digital converters 5A and 5B are connected by means of a data bus Bd to data processing means 6 of the PC type.

Moreover, as explained hereinbefore, the BIPAR electronic card makes it possible to determine a measurement of the amplitude and the rise time of the pulse coming from the CdTe detector with a view to determining the correction of the detector charge loss. It is this charge loss correction which is determined by means of the computer 6, because the relation between the rise time and the charge loss is not immediate. Thus, the relation between the rise time and the charge loss is dependent both on the electronics and the CdTe detector used. It is therefore necessary to carry out a calibration for each detector. According to the invention, the data processing means 6 consequently make it possible to determine the "amplitude/rise time" relation for each detector and for a given BIPAR electronics. The calibration process consists of measuring, for each pulse rise time, the detector response to calibrated stresses, i.e. lines of known radio-active elements. Two lines can be sufficient to obtain a satisfactory correction.

In order to measure the detector response for all the rise times, it is necessary for said two lines to have a certain minimum energy, in order to bring about a depth penetration of the crystal of each detector, but at the same time not an excessive energy, so that the calibration time is not too long. In other words, the calibration of the device consists of exposing the detector which it is wished to use to a mixture of these two sources and then record the number of events received for each amplitude and rise time.

For example, for detectors having crystals with a thickness of 2 mm, the $57_{CO}$ line at 122 KeV and $133_{BA}$ line at 356 KeV are completely satisfactory. These two elements also have the advantage of relatively long life periods.

More specifically, the data processing and calibration process used by the data processing means 6 operates in the following way:

the data are represented in an amplitude/time diagram, where the abscissa axis is the axis of the amplitudes and the ordinate axis the time axis, for each rise time, the spectrum of the amplitude lines is plotted, in the calibration phase, the process consists of automatically calculating a mathematical law representative of the variation of the maximum of the lines as a function of the energy and the rise time, in accordance with mathematical criteria dependent on the desired precision, in the normal measurement phase, the correction law deduced from the calibration is directly applied to the data read in to the memory.

Figure 4A:
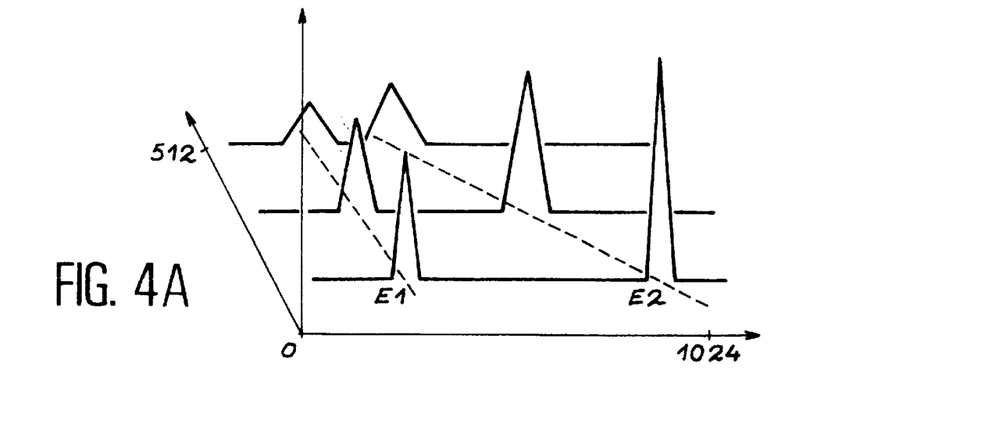
FIGS. 4A and 4B show amplitude/time diagrams revealing the spectra of the lines of the pulses from the CdTe detector.

FIG. 4A shows in an amplitude/rise time/event number diagram, where the x axis comprises 1024 channels and the z axis 512 channels, the number of events received for each amplitude and rise time. On the basis of this plot dotted lines show the positions of the maxima corresponding to the energies E1 and E2. These positions were transferred to FIG. 4B, which is a diagram of the rise time as a function of the amplitude. For each rise time, starting from the shortest times, the first significant maxima are sought. For each longer rise time, definition takes place of two regions of interest, each corresponding to lines, based on the results obtained for the immediately lower rise time.

Figure 4B:
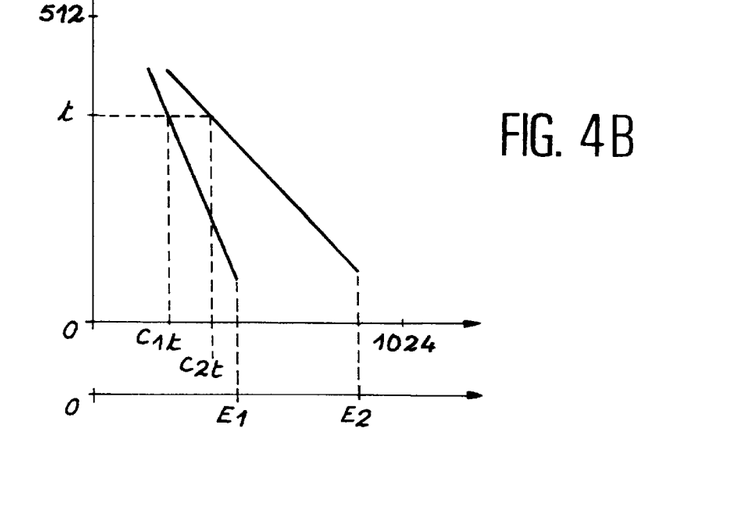

This operation consists of determining the positions of the maxima $C_{1t}$ and $C_{2t}$, as well as the width of the lines in these regions of interest for each rise time t. This is followed by the calculation of the gain and offset correction parameters in the following way:

$$GAIN(t) = (E2-E1)/(C_{2t}-C_{1t});$$

$$OFFSET(t) = E1 - GAIN(t) \times C_{1t}.$$

These parameters are then recorded in a file, which constitutes the calibration file of the detector. It is thus possible to carry out a series of measurements with the same detector without having to recommence the operation, because the necessary data have been stored during the initial calibration.

Any change of detector requires a new calibration, unless the new detector has already been calibrated. If radioactive calibration sources are not too prejudicial with respect to the measurement, the calibration and measurement stages can be simultaneous.

More specifically, this operation consists of carrying out a maximum search in a region of interest (N1, N2) of the spectrum. The spectrum is smoothed by taking a current mean relating to a number DIM of channels, in which DIM=(N2-N1)/4.

The derivative D of the smoothed spectrum (SL) is then calculated:

$$D(i) = SL(i+DIM/2) - SL(i-DIM/2).$$

The passage from 0 to D is obtained by linear interpolation between the two channels surrounding it, said value being the position of the line. The positions of the right and left extremes of D make it possible to estimate the total, mid-height width of the peak of the line (FWHM), by applying a relation dependent on the dimension of the region of interest:

$$FWHM = [RIGHT-LEFT]^2 - 0.87 \times (DIM/2)^2,$$

the LEFT and RIGHT values obtained at time t-1 defining the limits N1 and N2 of the region of interest at time t.

The process implemented by said data processing means consists of correcting any subsequent measurement on the basis of the data of the calibration file in order to generate a corrected spectrum with respect to the charge losses. This operation consists of redistributing the events measured in the channel C with the rise time t between the energies:

$$GAIN(t) \times c + OFFSET(t)$$

and $$GAIN(t) \times (c+1) + OFFSET(t).$$

Any subsequently performed measurement using the calibrated detector can then be corrected in the same way in real time or deferred time.

The previously described correction process can obviously be simplified by using a single calibrated spectrum line, obviously this being detrimental to the precision. However, it is also possible to use more than two spectrum lines, so as to further increase the calibration precision.

This process can also be performed on digitized measurements of the amplitude and rise time of pulses supplied by a detector having charge losses, in the case where said measurements would be supplied by an electronic apparatus other than a BIPAR electronic card, e.g. the apparatus manufactured by EURORAD and referred to under "Prior art" in the present text.

The device according to the invention, adapted to a high quality CdTe detector, makes it possible to obtain a simple system, which is flexible in use, easily transportable, relatively inexpensive and having very good spectroscopic performance characteristics.

It also makes it possible to implement a camera gamma without photomultipliers and therefore with all the resulting material gains. This camera gamma can be used in numerous fields, i.e. medical imaging, the control and dismantling of nuclear power stations, gamma astronomy, etc.

We claim:

1. System for the processing of pulses from a detector having charge losses, comprising:

an input circuit providing said pulses in analog forms; and electronic measuring means ensuring a measurement of the amplitude of each analog pulse, as well as a measurement of the rise time of said pulse, wherein the electronic measuring means incorporate an amplitude circuit ensuring the acquisition of a maximum value of the amplitude of the analog pulse and a time circuit ensuring a minimizing of the noise of said pulse, as well as a detection of the end of the rise time of said pulse, said two circuits being coupled so as to ensure the determination of the pulse rise time, and wherein said time circuit has a peak detector with representative signals respectively of the amplitude of the pulse ($S_{TSO}$) and a control circuit ($S_{TAS}$) permitting the acquisition of said amplitude and includes a comparator receiving said representative signals at two inputs of said comparator.

2. System according to claim 1, characterized in that the electronic measuring means incorporate a ramp circuit connected to the amplitude circuit and to the time circuit.

3. System according to claim 2, characterized in that the electronic measuring means incorporate a logic control unit connected to the amplitude circuit, the time circuit and the ramp circuit to control the information exchange between these circuits.

4. System according to claim 1, characterized in that it has correction means for correcting, as a function of the rise time and amplitude of the pulse, the detector charge losses.

5. System according to claim 4, characterized in that the correction means are data processing means able to model the charge losses of the detector, followed by the determination and correction, as a function of the modelling of the detector and the rise time determined by the measuring means, the charge losses due to said detector.

6. System according to claim 5, wherein the data processing means models the charge losses of the detector by a measurement stage, for each rise time, of the response of the detector to calibrated stresses and the determination of a variation relation of said responses as a function of the rise time and a second stage of correcting the charge losses by applying said relation to new measurements.

* * * * *